United States Patent
Schefenacker et al.

(10) Patent No.: US 9,985,785 B2
(45) Date of Patent: May 29, 2018

(54) ALIGN SESSION SECURITY FOR CONNECTED SYSTEMS

(71) Applicant: INTERNATIONAL BUSINESS MACHINES CORPORATION, Armonk, NY (US)

(72) Inventors: Sascha Schefenacker, Holzgerlingen (DE); Stefan Schmitt, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 15/053,190

(22) Filed: Feb. 25, 2016

(65) Prior Publication Data
US 2017/0250812 A1 Aug. 31, 2017

(51) Int. Cl.
| H04L 29/06 | (2006.01) |
| H04L 9/32 | (2006.01) |
| H04L 9/30 | (2006.01) |
| H04L 9/14 | (2006.01) |

(52) U.S. Cl.
CPC ............. *H04L 9/321* (2013.01); *H04L 9/14* (2013.01); *H04L 9/30* (2013.01); *H04L 63/062* (2013.01); *H04L 63/083* (2013.01)

(58) Field of Classification Search
CPC ... H04L 9/321; H04L 9/14; H04L 9/30; H04L 63/062; H04L 63/083
USPC ......................................................... 713/155
See application file for complete search history.

(56) References Cited

U.S. PATENT DOCUMENTS

| 7,356,694 B2 | 4/2008 | Mayo et al. |
| 8,402,141 B2 | 3/2013 | Seraphin |
| 8,578,462 B2 | 11/2013 | Petrovic |
| 8,707,405 B2 | 4/2014 | O'Donnell et al. |
| 8,832,812 B1 | 9/2014 | Morneau et al. |
| 9,147,062 B2 | 9/2015 | Bennett et al. |
| 9,344,505 B1 * | 5/2016 | Martin ................. H04L 67/146 |
| 2005/0132222 A1 * | 6/2005 | Petrovic ................ H04L 9/3213 726/4 |

(Continued)

OTHER PUBLICATIONS

IBM, "Token timeout behavior when LTPA is used as the authentication mechanism for WebSphere Process Server (WPS) and IBM Business Process Manager (BPM) Advanced," downloaded from internet Nov. 20, 2015, pp. 1-5.

*Primary Examiner* — Mohammad W Reza
(74) *Attorney, Agent, or Firm* — Richard Wilhelm, Esq.; Matthew M. Hulihan; Heslin Rothenberg Farley & Mesiti P.C.

(57) ABSTRACT

Granting an aligned secured access to a resource for a client system. A first authentication token and a first validity time period value are received from a first server. The first authentication token includes an authorization for accessing the system resource and the predefined session time. The first authentication token including the predefined session time is sent from the client system to a second server. A second validity period value of a second validity period of a second authentication token for a service provided by the second server to the client system is set equal to the received predefined session time. The second authentication token for the second validity period is sent from the second server to the client system such that an aligned secured access is granted for the client system to the resource.

20 Claims, 6 Drawing Sheets

(56) References Cited

U.S. PATENT DOCUMENTS

2006/0075110 A1* 4/2006 Seraphin ................. H04L 63/08
 709/227
2008/0235805 A1* 9/2008 Pfitzmann ............... G06F 21/10
 726/27

\* cited by examiner

ALIGN SESSION SECURITY FOR CONNECTED SYSTEMS

BACKGROUND

One or more aspects of the invention relate generally to granting access to a system resource, and more specifically, to granting access in a single sign-on-environment.

A secure access to system resources has always been a relevant area of systems management in a multiuser computing environment. However, in a cloud computing based environment (or briefly "cloud computing" or "cloud system"), users from many different computing environments access system resources in a cloud computing center. This may be the case for SaaS (Software-as-a-Service), PaaS (Platform-as-a-Service) and/or IaaS (Infrastructure-as-a-Service) offerings. It is a requirement to ensure that only authorized people and related systems are given access to secured resources.

Often, a cloud service may require a collaboration of a plurality of backend systems. Users—or autonomous systems—do not want to log into each and every system from which a sub-service may be required in order to take advantage of one of the above mentioned services. In traditional, on-premise compute centers, single-sign-on solutions (SSO) are pretty common: a user—or a system—only needs to sign in once in order to access all related and required computing resources. However, to allow this technology in cloud-based computing environments, the on-premise concepts are to be adapted and enriched.

Instead of the full administrative control operating in the same domain and allowing an easy exchange of access keys, it needs to become more flexible as soon as computing systems operated by other parties—e.g., service providers—are connected, as is common in cloud computing. In order to support this advancement in technology, there are some SSO concepts in place, which may allow a seamless login process between systems of different parties or service providers as soon as a trusted—i.e., security key based—environment has been established. Those protocols known as openID (from the OpenID Foundation), OAuth (open standard authorization), OpenID Connect (OpenID Connect 1.0 is a simple identity layer on top of the OAuth 2.0 protocol), SAML (security access markup language) and others have been implemented.

However, as cloud systems become more complex, changes to and/or additions in the initial design of those solutions may be desirable.

SUMMARY

Shortcomings of the prior art are overcome and additional advantages are provided through the provision of a computer-implemented method of granting an aligned secured access to a system resource for a client system during a session having a predefined session time. The method includes receiving by the client system from a first server a first authentication token and a first validity time period value related to the first authentication token, wherein the first authentication token comprises an authorization for accessing the system resource and comprises the predefined session time; sending from the client system the first authentication token including the predefined session time to a second server; and receiving by the client system from the second server a second authentication token for a second validity period such that an aligned secured access is granted for the client system to the system resource, wherein a second validity period value of the second validity period of the second authentication token for a service provided by the second server to the client system is set equal to said received predefined session time.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The aspects defined above and further aspects of the present invention are apparent from the examples of embodiments to be described hereinafter and are explained with reference to the examples of embodiments, but to which aspects of the invention are not limited.

Embodiments of the invention will be described, by way of example only, and with reference to the following drawings.

DETAILED DESCRIPTION

In the context of this description, the following conventions, terms and/or expressions may be used:

The term 'aligned secured access' may denote an access to one or more resources in a distributed environment like a cloud computing environment. That may be a private cloud or a public cloud computing environment. The term 'aligned' may denote that an access to a second server may be aligned with rules defined in an authentication profile managed by a first server for a plurality of services available from a plurality of second servers. It may also be noted that a difference between the validity time period of an authentication token of or for a second server providing access to a service in the form of a system resource and the predefined (by the first server) session time may no longer be possible. This means that a simple default value setting for connections between the second server and any client system may not be used any more. Instead, the second authentication token used for a secure communication between the second server and the client system may have a validity time period value equal to the predefined session time value.

The term 'system resource' may denote any computational resource in the form of an access to data or a service, like computing resources or executable program code. The system resource may be delivered as a service to the client system.

The term 'client system' may denote any system or application running on a computing device accessing different servers, and thus system resources. It may be a browser or an autonomous system without a user operating it.

The term 'session' may denote a defined setup between two computing systems being in a communicational connection. The connection may be secured by key-based mechanisms (e.g., public/private methods). The key may have a limited life-time expressed as a validity period. It may also be time-stamped. The term 'predefined session time' in the context of the session may denote that the session may have a preset duration after which a re-authentication may be required. At the end of a session a forced logout may be performed between a client system and a server.

The term 'first authentication token' may denote a security token used to establish a secure, in particular encoded communication protocol used for a data exchange between two computing systems. More specifically, the first server may provide the first authentication token to the client system which may use it for an authentication required for a second server for accessing system resources.

The term 'validity time period value' may denote a numerical value defining a time period during which a related authentication token may be valid and used for communication purposes. After an expiration of the validity time period, a re-authentication may be required.

The term 'second authentication token' may denote a communication security token required for a time-limited secure communication between the client system and the second server.

The term 'single sign-on' (SSO) may denote a property of access control of multiple related, but independent computing systems. With this property, a user logs in—e.g., to the first server—with a single ID and password to gain access to a connected system or systems—e.g., the second server—without using different user names or passwords, or in some configurations seamlessly sign on at each system. This may typically be accomplished using the Lightweight Directory Access Protocol (LDAP) and stored LDAP databases on servers. A simple version of single sign-on may be achieved over IP networks using cookies if the sites share a common DNS parent domain. Conversely, single sign-off may be the property whereby a single action of signing out terminates access to multiple software systems. As different applications and resources support different authentication mechanisms, single sign-on is to internally translate and store credentials for the different mechanisms from the credential used for initial authentication.

In this document, cloud services and/or system resource are mentioned several times. Such services and/or system resource belong to cloud computing in general, which is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of certain characteristics, service models and deployment models.

Characteristics of cloud computing comprise, for example:
(i) On-demand self-service: A consumer can unilaterally provision computing capabilities, such as server time and network storage, as needed automatically without requiring human interaction with each service provider.
(ii) Broad network access: Capabilities are available over the network and accessed through standard mechanisms that promote use by heterogeneous thin or thick client platforms (e.g., mobile phones, laptop computers, tablet computers, and PDAs).
(iii) Resource pooling: The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.
(iv) Rapid elasticity: Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured service: Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing comprise, for example:
(i) Cloud Software as a Service (SaaS): The capability provided to the consumer is to use the provider's applications running on a cloud infrastructure. The applications are accessible from various client devices through a thin client interface, such as a Web browser (e.g., Web-based e-mail). The consumer does not manage or control the underlying cloud infrastructure, including network, servers, operating systems, storage, or even individual application capabilities, with the possible exception of limited user-specific application configuration settings.
(ii) Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.
(iii) Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing may comprise, for example:
(i) Private cloud. The cloud infrastructure is operated solely by an organization. It may be managed by the organization or a third party and may exist on premise or off premise.
(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.
(iii) Public cloud. The cloud infrastructure is made available to the general public or a large industry group and is owned by an organization selling cloud services, e.g., a cloud Service provider.
(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness, low coupling, modularity, and semantic interoperability.

Often, a cloud service may require a collaboration of a plurality of backend systems. Users—or autonomous systems—do not want to log into each and every system from which a sub-service may be required in order to take advantage of one of the services mentioned above (e.g., SaaS, PaaS, and/or IaaS). In traditional, on-premise compute centers, single-sign-on solutions (SSO) are pretty common: a user—or a system—only needs to sign in once in order to access all related and required computing resources. However, to allow this technology in cloud-based computing environments, the on-premise concepts are to be adapted and enriched.

Instead of the full administrative control operating in the same domain and allowing an easy exchange of access keys, it needs to become more flexible as soon as computing systems operated by other parties—e.g., service providers—are connected, as is common in cloud computing. In order to support this advancement in technology, there are some SSO concepts in place, which may allow a seamless login process between systems of different parties or service providers as soon as a trusted—i.e., security key based—environment has been established. Those protocols known as openID (from the OpenID Foundation), OAuth (open standard authorization), OpenID Connect (OpenID Connect 1.0 is a simple identity layer on top of the OAuth 2.0 protocol), SAML (security access markup language) and others have been implemented.

However, now, as the cloud systems get more and more complex, some details are required that where not covered in the initial design of those solutions. After a login, a user is to have a specific time to work with a system without the need of re-authentication. This security session validity time may be configured—e.g., with an out-of-the-box installation of a web server, e.g., IBM Websphere—to, e.g., 120 minutes for LTPA (lightweight third party authentication). A web server, like the IBM Websphere server, may provide a cloud-based service for a client system.

On the other side, a client system may use another service, e.g., an authentication from an identification provider (IdP). The validity time for such an identification service may also be configured, e.g., for the same amount of time as the cloud-based service, i.e., the service of the web server. Both related time-out values may be synchronized, i.e., be set manually or configured manually to the same validity time value. Thus, a secured session may run for 120 minutes until a re-authentication may be required.

If the validity time period of the identification provider may be less or much less than the validity time period of the web server, a user may access the web server for a time not defined by the validity period of the identification provider but of the web server. In the best case, this may only be confusing; worst case, a client system may get too long of an access to the web server without a re-authentication even if the validity period of the identification provider has been exceeded (because it may not be checked again).

This problem becomes even worse if different identification providers may be used for different users and different security categorizations as is common in cloud computing environments. Typically, the validity time of the identification provider and the validity time of the web server may be completely out of sync because the validity time of the web server may be fixed to one single time value for all accesses from different client systems and/or different users. It may be noted that the validity time for a security token may always be a system setting; thus, no validity period may be set for a web server depending on different security requirements.

Aspects of the computer-implemented method for granting an aligned access to a system resource may offer the following:

Validity periods of security tokens may be aligned in a distributed computing environment, like a cloud computing environment. There may no longer be one validity period defined by a central identification or authorization service working as a central point for a single-sign-on mechanism and other security token validity times for different services assessed using authentication information from the central authorization service. The server providing a specific service may manage and store different validity time period values, of which each one may be related to a different first security token provided by the authorization service, i.e., the first server.

A situation in which an authorization service defines one validity period for a token, and thus for accessing a system resource of the second server and, on the other side, the system resource may be available for a different period of time because the system resource has a different—e.g., longer—validity time setting may not happen again. Hence, an aligned access to a system resource, like a cloud service, may be guaranteed. Additionally, an unexpected re-authorization for a service in a cloud environment may also not be required because of unaligned validity periods of involved security tokens. This may also reduce the burden of manually aligning system setting of authorization services and server system for granting access to a system resource. All in all, the cloud computing environment with a single-sign-on capability may become more secure in terms of data and service access security.

According to one embodiment of the computer-implemented method, the first server may provide an authentication service like an identification server operated by an identity provider. Typically, during an initial set-up phase, identification of a user may be determined by the identity provider and may be linked to a user ID (i.e., identifier) for accessing the first server as well as other system resources—e.g., second servers—of a distributed environment.

According to one additional embodiment of the computer-implemented method, the second server may grant access to the system resource. The system resource may be a data file accessible via the second server or a program service being executed on the second server. The program service may be a complete program providing, e.g., dialog and some transactional functionalities or it may be a component in a plurality of program services distributed across a plurality of second servers. The access to the system resource may be based on the first authentication token. As a prerequisite, it may be ensured that the first server and the second server—as well as the client system—work in a trusted environment, i.e., data exchange may be secured by, e.g., a known public/private key mechanism or other secure data transmission methods.

According to one embodiment of the computer-implemented method, the first validity period of the first authentication token may be shorter than the second validity period value of the second authentication token. The first authentication token may only be used for the initial process of a single sign-on. Thus, a user may—via the client system—login on the first server, i.e., an identity server, to set up a connection requiring authentication credentials to a second server providing access to the system resource. Because this login process may only require a short amount of time—e.g., a couple of seconds—the active lifespan of the first authentication token may be (much) smaller than the time for a secure session established between the client system and the second server.

According to an embodiment of the computer-implemented method, the predefined session time may be different for different client systems. Thus, security mechanisms may be tailored to different client systems having a different security status. E.g., an access for client systems operated physically inside defined enterprise boundaries may be allowed longer predefined session times than client systems being operated outside physical boundaries of an enterprise, e.g., using public network lines.

According to a further embodiment of the computer-implemented method, the first validity period may be different for different users of the same client system. Thus, there may be a situation in which the same network browser may be used by different users which may typically access information of different sensitivity. E.g., a first user accessing a human resource system may have stronger requirements for accessing these sensitive data than those applied to a second user accessing commercial transactional data or a customer relationship system.

According to one embodiment of the computer-implemented method, the client system may receive additionally a login token from the first server. This optional login token may be used by the client system in case an access to a third server may be intended which may also be a component in the single sign-on environment. However, a user using the client system may not be required to login again to the first server, i.e., the identification server, but may instead use the login token for the user's authentication. The first server may thus provide an authentication—and optionally a third validity time value—for accessing a system resource provided by the second server. This has the advantage that the user may not be required to provide the user's user ID and password to the first server.

According to one embodiment of the computer-implemented method, a plurality of second validity period values—and thus, a plurality of predefined session times—may be used, managed and stored by the second server, such that each one may be related to one of a plurality of first authentication tokens received. Thus, the second server may differentiate secure access times related to different second validity time periods, i.e. predefined session times, for different users, different client systems, or other parameters related to security settings.

According to a further embodiment of the computer-implemented method, the authorization for accessing the system resource may be generated by the first server based on a time-stamp and/or a private key of the first server or a destination identifier of the second server. The second server may have stored a public key related to a private key of the first server such that a trusted secured computing environment may be established between the first server and the second server, including as well the client system.

In the following, a detailed description of the figures will be given. All instructions in the figures are schematic. Firstly, a block diagram of an embodiment of the computer-implemented method for granting an aligned access to a system resource, in accordance with one or more aspects, is given. Afterwards, further embodiments, as well as embodiments of the system for granting an aligned access to a system resource for a client system will be described.

Figure 1:
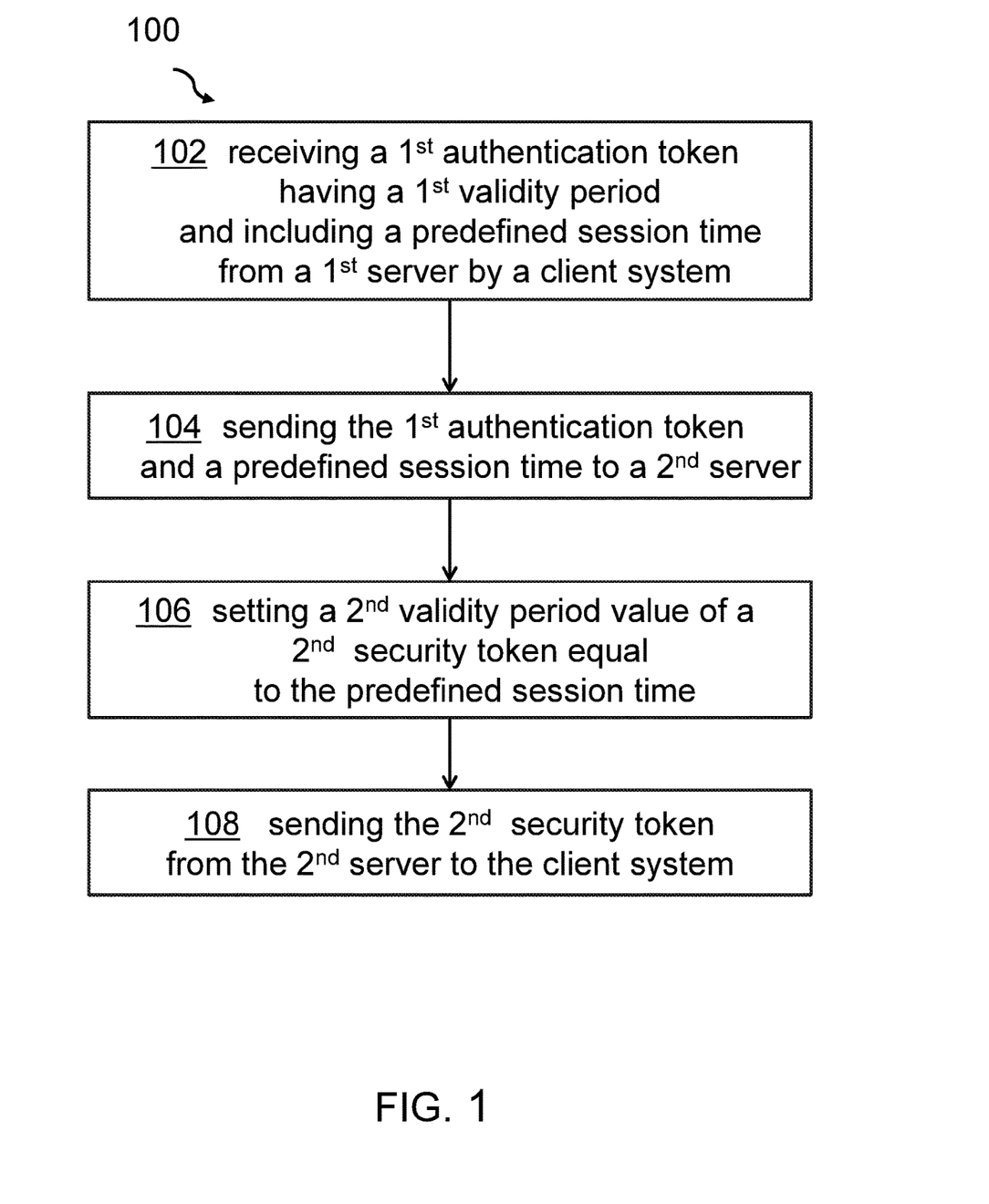
FIG. 1 shows a block diagram of an embodiment of a computer-implemented method for granting an aligned access to a system resource, in accordance with an aspect of the present invention.

FIG. 1 shows a block diagram of an embodiment of computer-implemented method 100 for granting an aligned access to a system resource. This system resource may be a server—here, the second server—in a distributed computing environment or may be provided by a service provider in a cloud computing environment. The access may be granted for a client system, e.g., a browser or other interactive systems, allowing access to the system resource. The browser may be operated or used by a user. The access may be granted for a session which may have a related predefined session time. Thus, a time-limited security session may be established. The method 100 comprises receiving, 102, by the client from a first server, i.e. an identification server, a first authentication token, e.g., an SSO/SAML, token with a relatively short first validity period of, e.g., a couple of seconds, which may be related to the first authentication token. The first authentication token comprises an authorization or authentication for accessing the system resource and comprises the predefined session time. Thus, a value for the first validity time period—a first validity period value—may be integrated into the first authentication token.

Then, the method 100 comprises sending, 104, the first authentication token including the predefined session time from the client system to a second server. There, a second validity period value—which may be different by default to the predefined session time—of a second validity period relating to a second authentication token for the service—i.e., access to the system resource—provided by the second server to the client system is set, 106, equal to the received predefined session time. Finally, the second authentication token for the second validity period is sent, 108, from the second server to the client system such that an aligned secured access is granted for the client system to the system resource. Hence, a secured time-limited connection between the client system and the second server is limited in time by the predefined session time and not by the default time of the second server in a trusted single sign-on environment.

It may also be noted that all communication between the client system and the first server, the client system and the second server, and the first server and the second server may be performed in a secure, e.g., security key-based manner, in which authentication tokens may play a significant role, in order to enable a trusted computing environment.

Figure 2:
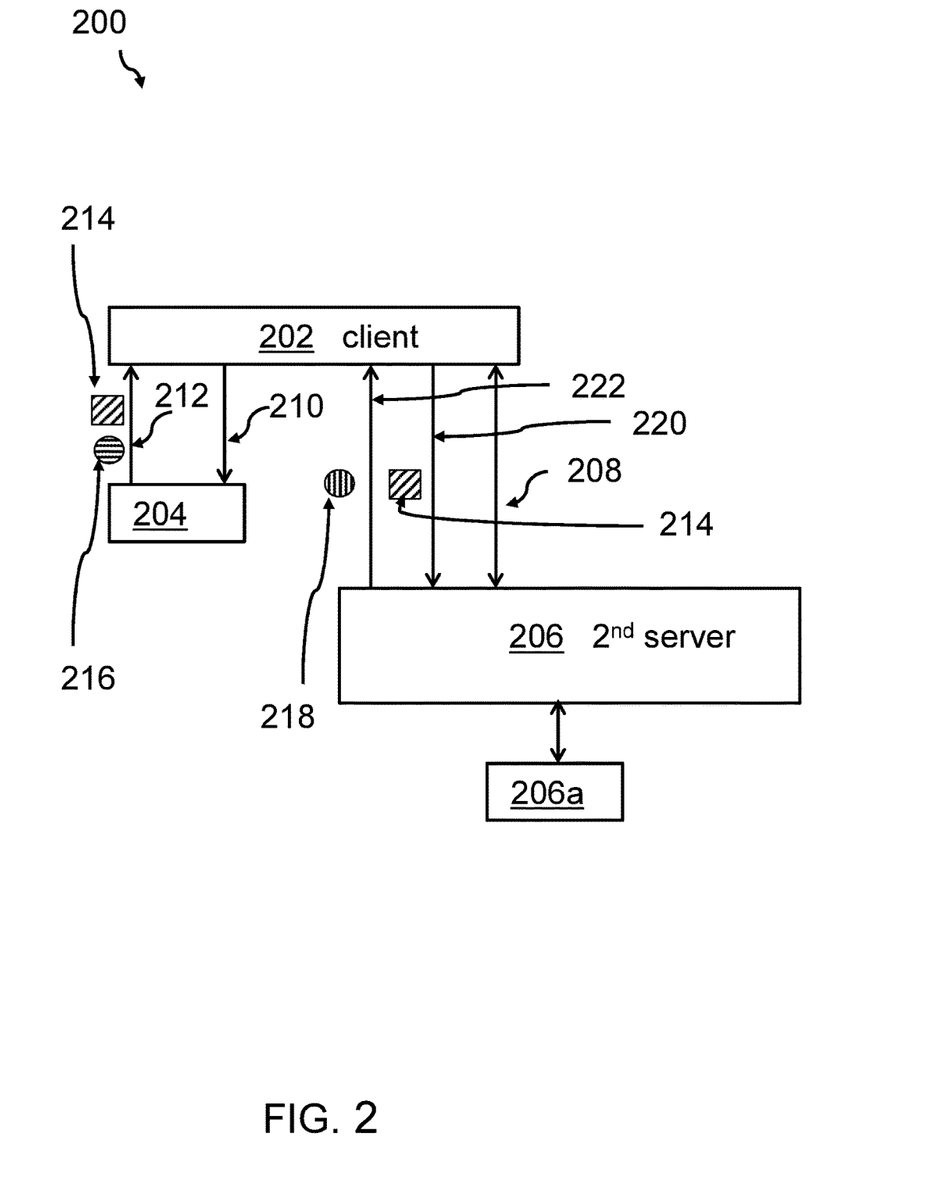
FIG. 2 shows a block diagram of an embodiment of involved partial systems of the system for granting access to a system resource, in accordance with an aspect of the present invention.

FIG. 2 shows a block diagram 200 of an embodiment of involved partial systems of the system for granting access to a system resource 206a. As an example, three involved systems are shown: a client system 202, a first server 204 and a second server 206. The client system 202 may, e.g., be a known network browser for accessing resources like programs or data in a networked environment. If the client system 202 tries to access, 208, a resource 206a managed by the second server 206, the client system 202 may be redirected, 210, to an identity server or first server 204. Here, a central login is required, typically with a user ID and password. The client system 202 receives back, 212, a first authentication token 214 with a comparably low validity time (e.g., a couple of seconds). A part of the first authentication token 214 is a predefined session time provided by the first server 204 which may be specific to a user, a client system 202 and/or a resource 206a provided by the second server 206. Thus, tight security settings may be provided.

The client system 202 sends, 220, this first authentication token to the second server 206. The second server 206 may have stored and may use a default session time for communication between the client system 202 and the second server 206. However, this default session time may differ from the predefined session time provided by the first server 204. Additionally, the second server 206 may use the default session time for all sessions with different users using different client systems 202. This may represent a security threat to the integrity of the second server. Therefore, the validity time period of the second authentication token 218 is set to the predefined session time received as part of the first authentication token 214. Hence, the validation time period of the session established between the client system 202 and the second server 206 equals the predefined session time received via the first authentication token 214 and defined by the first server 204.

Consequently, the second server 206 is capable of managing predefined session times for different client systems and different users accessing system resources 206a provided by the second server 206. The second authentication token is used in a known secured communication environment between the client system 202 and the second server 206 for a secure key-based communication.

Additionally, the client system 202 may receive an additional login token 216. As part of this login token a validity period for the login of the client system 202 to the first server 204 may be defined. If the client system 202 wants to establish a secure communication to a third server (not shown but comparable to the second server 206 also providing access to comparable system resources 206a), the client system may use this login token 216 for having generated a new first authentication token for accessing resources on the third server. Thus, a re-identification of the client system 202 to the first server 204 may not be required as long as the login token 216 is valid.

Figure 3:
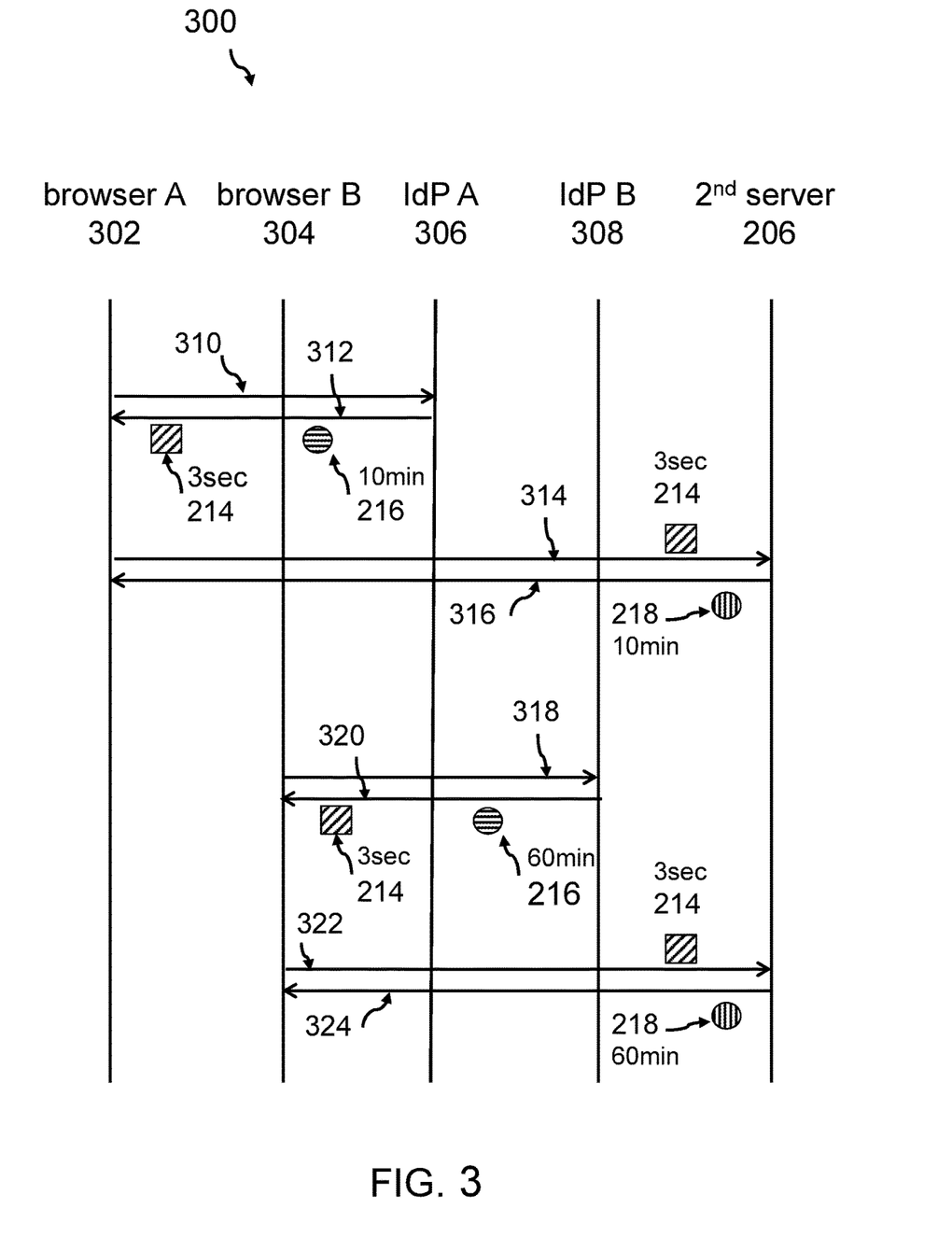
FIG. 3 shows a block diagram of a state and information flow diagram relating to aspects of the method, in accordance with an aspect of the present invention.

FIG. 3 shows a block diagram 300 of a state and information flow diagram relating to aspects of method 100. The figure shows a browser A 302 or client system 202, a browser B 304 or another client system 202, a server of an identity provider IdP A 306, another server of another identity provider IdP B 308, and the second server 206. IdP A 306 and/or IdP B 308 may be identical to the different instances of the first server 204 of FIG. 2.

Browser 302 may login, 310, into IdP 306 receiving back, 312, a first authentication token 214—valid for, e.g., 3 seconds—and a second login token 216—valid for, e.g., 10 minutes. It may be noted that on purpose or by accident the validation time period of the login token 216 may be identical to a predefined session time of 10 minutes. However, these two values do not have to be identical at all.

On the other side, the predefined session time is part of the first authentication token 214, received, 312, by the browser 302, which may then be passed, 314, from the browser 302 (i.e., the client system 202) to the second server 206. Here, the validity time period value of a second authentication token 218 may be set to the 10 minutes predefined session time period received via the first authentication token 214 from the browser 302. Based on this, the second authentication token 218 is sent, 316, from the second server 206 to the browser 302 for establishing a secure communication channel between the browser 302 and the second server 206 for a period of—in this example case—10 minutes.

A comparable flow of actions may be established between browser 304, IdP 308, and the second server 206. Browser 304 may login, 318, with the IdP 308, receiving back, 320, a first authentication token 214 with another predefined session time—here 60 minutes. This time period of 60 minutes may also be used for the lock and token 216 which may in turn be used for a secure login time between browser 304 and IdP 308. Browser 304 may then pass, 322, the first authentication token 214 to the second server 206 and receive back, 324, a second authentication token, 218 for a time period of 60 minutes.

Hence, the predefined session times and thus, the related second authentication token validity period are different as defined by IdP 306 and IdP 308, although the browser 302 and the browser 304 access the same second server 206 for an access to the same system resource 206a.

Figure 4:
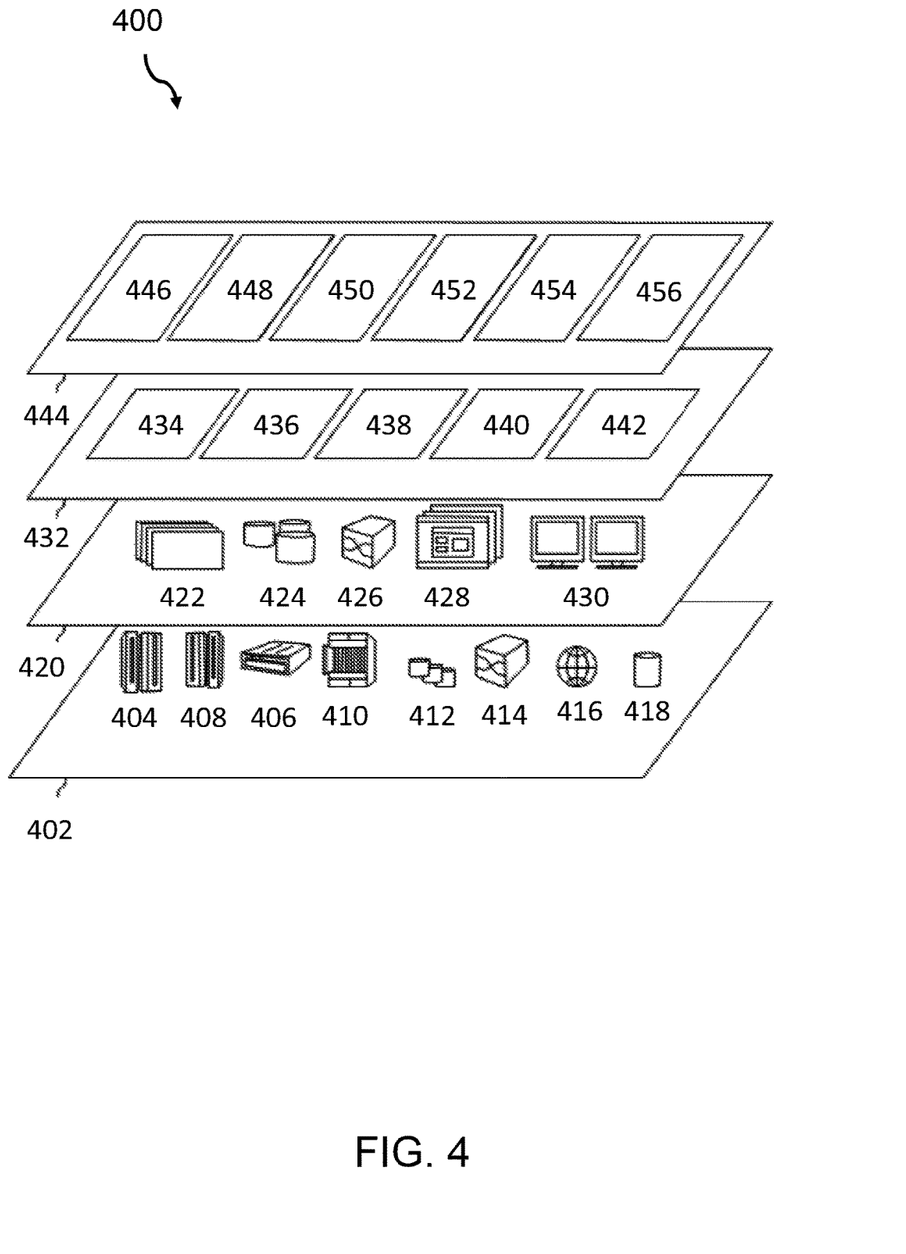
FIG. 4 shows a block diagram of an embodiment of a cloud computing environment in which aspects of the method and system may be used, in accordance with an aspect of the present invention.

FIG. 4 shows a cloud computing environment 400 in which at least parts of aspects of the present invention may be deployed. A set of functional abstraction layers provided by the cloud computing environment is shown. It should be understood in advance that the components, layers, and functions shown in FIG. 4 are intended to be illustrative only and embodiments of the invention are not limited thereto. As depicted, the following layers and corresponding functions are provided: Hardware and software layer 402 includes hardware and software components. Examples of hardware components include: mainframes 404; servers 406; RISC (Reduced Instruction Set Computer) architecture based servers 408; Blade servers 410; storage devices 412; networks 414 and networking components 414. In some embodiments, software components include network application server software 416 and/or database software 418.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430. In one example, management layer 432 may provide the functions described below. Resource provisioning 434 provides dynamic procurement of computing resources and other resources that are utilized to perform tasks within the cloud computing environment. Metering and pricing 436 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 438 provides access to the cloud computing environment for consumers and system administrators. Service level management 440 provides cloud computing resource allocation and management such that required service levels are met. Service Level Agreement (SLA) planning and fulfillment 442 provides pre-arrangement for, and procurement of, cloud computing resources for which a future requirement is anticipated in accordance with an SLA.

Workloads layer 444 provides examples of functionality for which the cloud computing environment may be utilized. Examples of workloads and functions which may be provided from this layer include: mapping and navigation 446; software development and lifecycle management 448; virtual classroom education delivery 450; data analytics processing 452; transaction processing 454; and potential monitoring functions 456.

Figure 5:
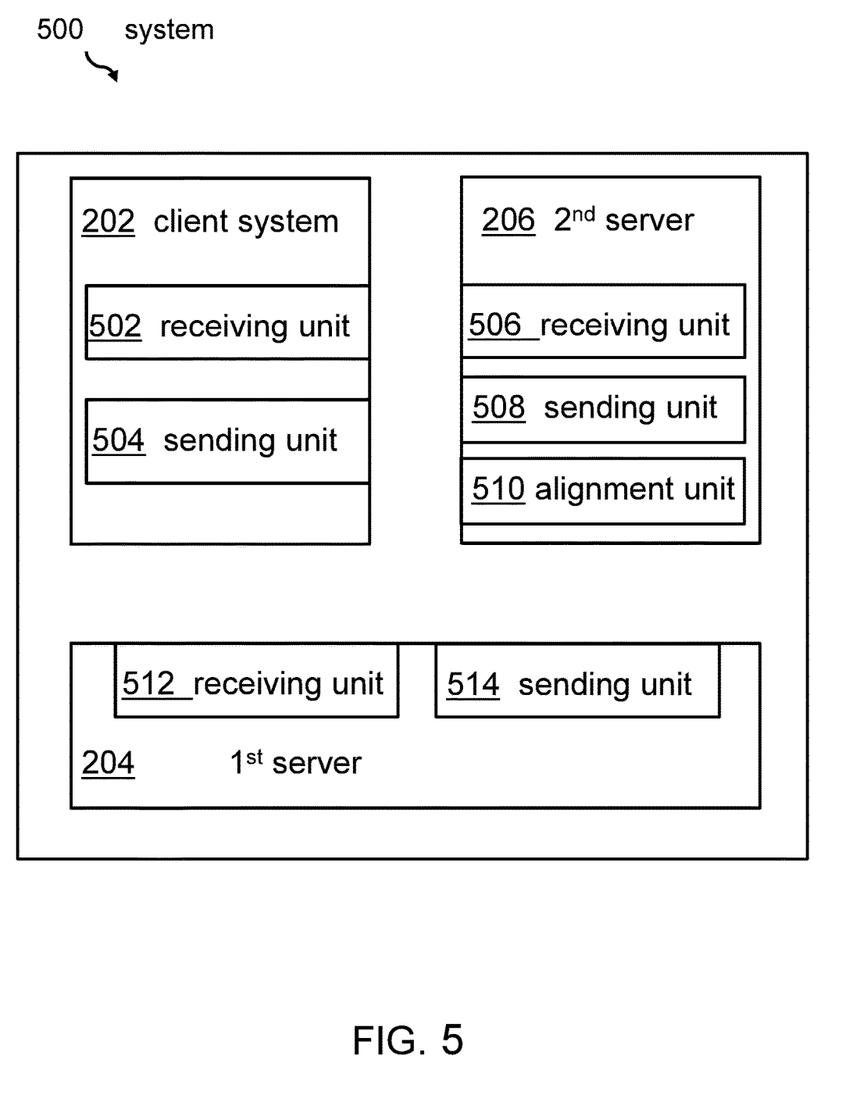
FIG. 5 shows an embodiment of the system for granting access to a system resource, in accordance with an aspect of the present invention.

FIG. 5 shows an embodiment of a system 500 for granting access to a system resource. An aligned access to a system resource is provided for a client system 202 during a session having a predefined session time. The client comprises a receiving unit 502 adapted for receiving from a sending unit 514 of the first server 204 a first authentication token 214 and a first validity time period value related to the first authentication token 214, such that the first authentication token 214 comprises an authorization for accessing the system resource 206a and the predefined session time. The receiving unit 512 of the first server 204 may also be used for receiving a user ID and password from the user via the client system 202 using the sending unit 504.

The client system 202 comprises also a first sending unit 504 adapted for sending the first received authentication token 214 including the predefined session time to a second server 206. The second server 206 comprise a receiving unit 506 for receiving the first authentication token 214 and an alignment unit 510 adapted for setting a second validity period value of a second validity period of a second authentication token 216 for a service provided by the second server 206 to the client system 202 equal to the received predefined session time.

The second server 206 comprises a second sending unit 508 adapted for sending said second authentication token 218 for said second validity period from the second server 206 to the client system 202—received by receiving unit 502—such that an aligned access is granted for the client system 202 to the system resource 206a managed by the second server 206.

Figure 6:
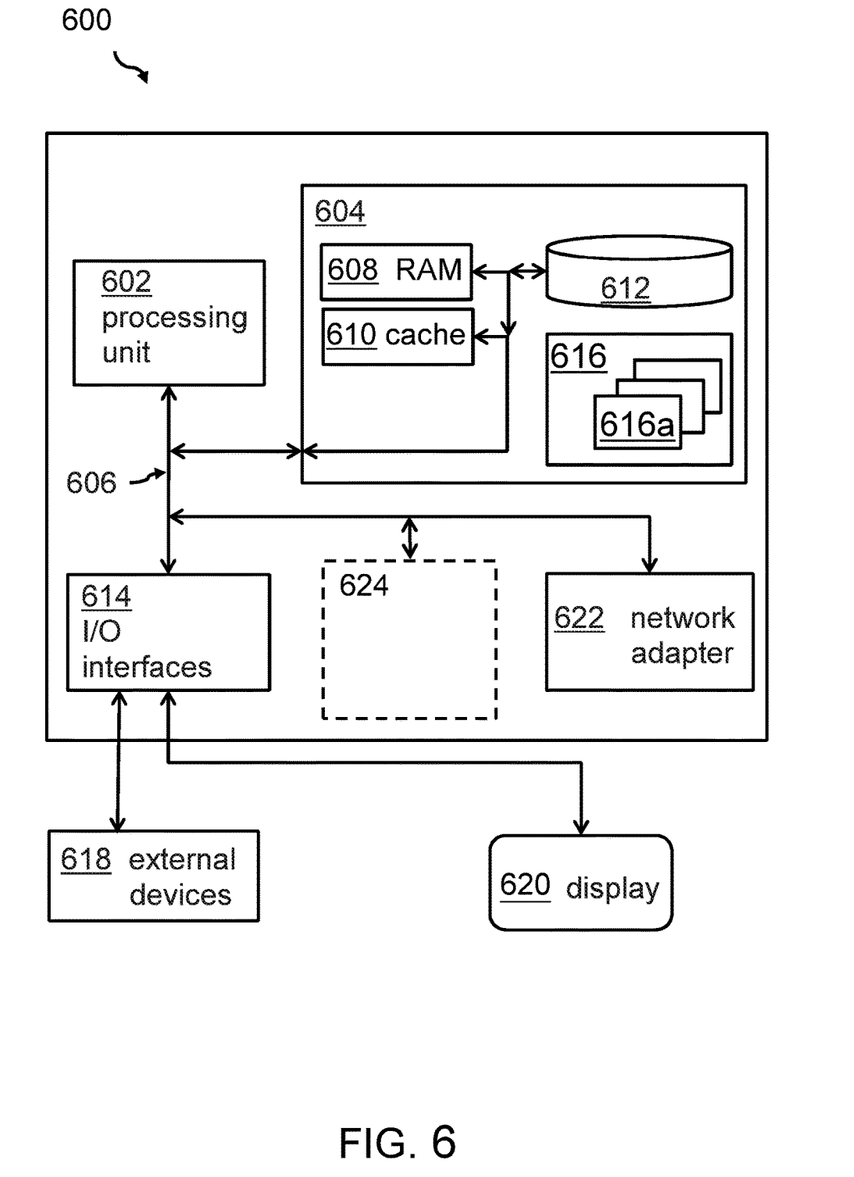
FIG. 6 shows an embodiment of a computing system suitable for being used for servers and a client, in accordance with an aspect of the present invention.

Embodiments of the invention may be implemented together with virtually any type of computer, regardless of the platform being suitable for storing and/or executing program code. FIG. 6 shows, as an example, a computing system 600 suitable for executing program code related to aspects of the method on the client system 202 and/or the first server 204 and/or the second server 206.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600.

Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 616, having a set (at least one) of program modules 616a, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the computer system/server 600 also comprises a unit 624 attached to the bus system 606 which may represent one or more units (e.g., receiving, sending, or alignment unit) specific to the first server 204, the client system 202, and/or the second server 206.

As described herein, according to one aspect of the present invention, a computer-implemented method for granting an aligned secured access to a system resource may be provided. The computer-implemented method may grant the aligned access to the system resource for a client system during a session having a predefined session time. The method may comprise receiving by the client from a first server a first authentication token and a first validity time period value related to the first authentication token. The first authentication token may comprise an authorization for accessing the system resource and the predefined session time.

The method may further comprise sending from the client system the first authentication token including the predefined session time from the client system to a second server, and setting a second validity period value of a second validity period of a second authentication token for a service provided by the second server—i.e., access to the system resource—to the client system equal to the received predefined session time. Furthermore, the method may comprise sending the second authentication token for the second validity period from the second server to the client system such that an aligned access is granted for the client system to the system resource.

According to another embodiment of the present invention, a system for granting an aligned access to a system resource for a client system may be provided. The system may grant the access for a client system during a session having a predefined session time. The client system may comprise a receiving unit adapted for receiving from a first server a first authentication token and a first validity time period value related to the first authentication token. The first authentication token may comprise an authorization for accessing the system and comprise the predefined session time.

The client may comprise a first sending unit adapted for sending the first authentication token including the predefined session time to a second server. The second server may comprise an alignment unit adapted for setting a second validity period value of a second validity period of a second authentication token for a service provided by the second server to the client system equal to the received predefined session time.

The second server may comprise a second sending unit adapted for sending the second authentication token for the second validity period from the second server to the client system such that an aligned access is granted for the client system to the system resource.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of, e.g., the method type claims, and features of the apparatus type claims, is considered as to be disclosed within this document.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Aspects of the present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit aspects of the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of aspects of the present invention has been presented for purposes of illustration and description, but is not intended to be exhaustive or limited to the aspects of invention in the form disclosed. Many modifications and variations will be apparent to those of ordinary skills in the art without departing from the scope and spirit of aspects of the invention. The embodiments are chosen and described in order to best explain the principles of the invention and the practical application, and to enable others of ordinary skills in the art to understand aspects of the invention for various embodiments with various modifications, as are suited to the particular use contemplated.

What is claimed is:

1. A computer-implemented method of granting an aligned secured access to a system resource for a client system during a session having a predefined session time, comprising:
   receiving by said client system from a first server a first authentication token and a first validity time period value related to said first authentication token, the first validity time period value defining a time period during which the first authentication token is valid, wherein said first authentication token comprises an authorization for accessing said system resource and comprises said predefined session time, the predefined session time comprising a preset duration of time for a session, the session to be established between the client system and a second server for accessing the system resource;
   sending from said client system said first authentication token including said predefined session time to the second server; and
   receiving, by said client system from said second server, a second authentication token for a second validity period during which the second authentication token is valid, such that an aligned secured access is granted for said client system to said system resource, wherein a second validity period value of the second validity period of the second authentication token for a service provided by said second server to said client system defines the time period during which the second authentication token is valid and is set equal to said received predefined session time, thereby making the time period during which the second authentication token is valid correspond to the preset duration of time, which is indicated by the predefined session time in the first authentication token from the first server, for the session between the client system and the second server for accessing the system resource.

2. The computer-implemented method according to claim 1, wherein said first server provides an authentication service.

3. The computer-implemented method according to claim 1, wherein said second server grants access to said system resource using said first authentication token.

4. The computer-implemented method according to claim 1, wherein said first validity time period value of said first authentication token is smaller than said second validity period value of said second authentication token.

5. The computer-implemented method according to claim 1, wherein said predefined session time is different for different client systems.

6. The computer-implemented method according to claim 1, wherein said predefined session time is different for different users of a same client system.

7. The computer-implemented method according to claim 1, wherein said client system further receives a login token from said first server.

8. The computer-implemented method according to claim 1, wherein a plurality of second validity period values are used by said second server, each one related to one of a plurality of first authentication tokens received.

9. The computer-implemented method according to claim 1, wherein said authorization for accessing said system resource is generated by said first server based on a time-stamp and a private key of said first server or a destination identifier of said second server, wherein said second server has stored a public key related to said private key of said first server.

10. A computer system for granting an aligned secured access to a system resource for a client system during a session having a predefined session time, comprising:
   a memory; and
   a processor in communication with the memory, wherein the computer system is configured to perform a method, said method comprising:
      receiving by said client system from a first server a first authentication token and a first validity time period value related to said first authentication token, the first validity time period value defining a time period during which the first authentication token is valid, wherein said first authentication token comprises an authorization for accessing said system resource and comprises said predefined session time, the predefined session time comprising a preset duration of time for a session, the session to be established between the client system and a second server for accessing the system resource;
      sending from said client system said first authentication token including said predefined session time to the second server; and
      receiving by said client system from said second server a second authentication token for a second validity period during which the second authentication token is valid, such that an aligned secured access is granted for said client system to said system resource, wherein a second validity period value of the second validity period of the second authentication token for a service provided by said second server to said client system defines the time period during which the second authentication token is valid and is set equal to said received predefined session time, thereby making the time period during which the second authentication token is valid correspond to the preset duration of time, which is indicated by the predefined session time in the first authentication token from the first server, for the session between the client system and the second server for accessing the system resource.

11. The computer system according to claim 10, wherein said second server grants access to said system resource using said first authentication token.

12. The computer system according to claim 10, wherein said first validity time period value of said first authentication token is smaller than said second validity period value of said second authentication token.

13. The computer system according to claim 10, wherein a plurality of second validity period values are used by said second server, each one related to one of a plurality of first authentication tokens received.

14. The computer system according to claim 10, wherein said authorization for accessing said system resource is generated by said first server based on a time-stamp and a private key of said first server or a destination identifier of said second server, wherein said second server has stored a public key related to said private key of said first server.

15. A computer program product for granting an aligned secured access to a system resource for a client system during a session having a predefined session time, comprising:
   a computer readable storage medium readable by a processing circuit and storing instructions for execution by the processing circuit for performing a method comprising:
      receiving by said client system from a first server a first authentication token and a first validity time period value related to said first authentication token, the first validity time period value defining a time period during which the first authentication token is valid, wherein said first authentication token comprises an authorization for accessing said system resource and comprises said predefined session time, the predefined session time comprising a preset duration of time for a session, the session to be established between the client system and a second server for accessing the system resource;

sending from said client system said first authentication token including said predefined session time to the second server; and receiving by said client system from said second server a second authentication token for a second validity period during which the second authentication token is valid, such that an aligned secured access is granted for said client system to said system resource, wherein a second validity period value of the second validity period of the second authentication token for a service provided by said second server to said client system defines the time period during which the second authentication token is valid and is set equal to said received predefined session time, thereby making the time period during which the second authentication token is valid correspond to the preset duration of time, which is indicated by the predefined session time in the first authentication token from the first server, for the session between the client system and the second server for accessing the system resource.

16. The computer program product according to claim 15, wherein said first server provides an authentication service.

17. The computer program product according to claim 15, wherein said second server grants access to said system resource using said first authentication token.

18. The computer program product according to claim 15, wherein said first validity time period value of said first authentication token is smaller than said second validity period value of said second authentication token.

19. The computer program product according to claim 15, wherein a plurality of second validity period values are used by said second server, each one related to one of a plurality of first authentication tokens received.

20. The computer program product according to claim 15, wherein said authorization for accessing said system resource is generated by said first server based on a timestamp and a private key of said first server or a destination identifier of said second server, wherein said second server has stored a public key related to said private key of said first server.

* * * * *